(12) United States Patent
Eigeldinger

(10) Patent No.: US 7,917,925 B2
(45) Date of Patent: Mar. 29, 2011

(54) METHOD AND APPARATUS FOR AUTOMATICALLY EXTRACTING DATA IDENTIFYING A BROADCAST A/V PROGRAM

(75) Inventor: Norbert Eigeldinger, Villingen (DE)

(73) Assignee: Thomson Licensing, Boulogne Billancourt (FR)

( * ) Notice: Subject to any disclaimer, the term of this patent is extended or adjusted under 35 U.S.C. 154(b) by 321 days.

(21) Appl. No.: 11/472,960

(22) Filed: Jun. 22, 2006

(65) Prior Publication Data

US 2007/0033608 A1    Feb. 8, 2007

(30) Foreign Application Priority Data

Aug. 3, 2005 (DE) .................................. 053 00 646

(51) Int. Cl.
*G06F 3/00* (2006.01)
(52) U.S. Cl. ................ 725/39; 725/17; 725/20; 725/38; 725/40; 725/135; 348/731
(58) Field of Classification Search .................. 725/20, 725/17, 135, 38–40; 348/731
See application file for complete search history.

(56) References Cited

U.S. PATENT DOCUMENTS

| | | | | |
|---|---|---|---|---|
| 6,014,183 | A * | 1/2000 | Hoang | 348/702 |
| 6,581,207 | B1 | 6/2003 | Sumita et al. | |
| 6,742,184 | B1 * | 5/2004 | Finseth et al. | 725/52 |
| 6,760,918 | B2 * | 7/2004 | Rodriguez et al. | 725/134 |
| 2003/0046699 | A1 | 3/2003 | Nonomura et al. | |
| 2003/0093806 | A1 * | 5/2003 | Dureau et al. | 725/107 |
| 2003/0145320 | A1 | 7/2003 | Vogel | |
| 2003/0198461 | A1 * | 10/2003 | Taylor et al. | 386/83 |
| 2005/0055715 | A1 | 3/2005 | Minnick et al. | |

FOREIGN PATENT DOCUMENTS

| | | |
|---|---|---|
| EP | 1 187 467 A | 3/2002 |
| EP | 1241 878 A2 | 9/2002 |
| EP | 1 292 137 A1 | 3/2003 |
| EP | 1292137 A1 * | 3/2003 |
| EP | 1 355 489 A2 | 10/2003 |
| WO | WO 2004/053842 A2 | 6/2004 |

OTHER PUBLICATIONS

Search Report Dated Nov. 30, 2005.

* cited by examiner

*Primary Examiner* — Joseph P Hirl
*Assistant Examiner* — Jivka Rabovianski
(74) *Attorney, Agent, or Firm* — Robert D. Shedd; Joseph J. Opalach; Reitseng Lin

(57) ABSTRACT

Broadcast receiving devices usually have access to an electronic program schedule or EPG. Since often the same audio/video program is broadcasted more than once within a short time range on the same channel, or simultaneously on another channel, a method is provided for notifying this fact to the user. According to the invention, a method for automatically extracting data identifying a broadcast A/V program from received broadcast data includes the steps of receiving user input defining a first program, analyzing an EPG, determining broadcast data of the first program, automatically detecting that an identical second program is scheduled for broadcast, and displaying an indication to the user indicating that the second program was detected. If e.g. the same program is broadcasted at different times or channels with different amount of commercial interruptions, the user may select the instance with less commercials for viewing or recording.

13 Claims, 2 Drawing Sheets

| | Start | Stop | Date | ChName | Title |
|---|---|---|---|---|---|
| PI1 | 20.15 | 22.45 | 11-04 | RTL | Pearl Harbour |
| PI2 | 2.15 | 4.25 | 12-04 | RTL | Pearl Harbour |

|     | Start | Stop  | Date  | ChName | Title         |
|-----|-------|-------|-------|--------|---------------|
| PI1 | 20.15 | 22.45 | 11-04 | RTL    | Pearl Harbour |
| PI2 | 20.15 | 22.15 | 11-04 | ORF    | Pearl Harbour |

|     | Start | Stop  | Date  | ChName | Title         |
|-----|-------|-------|-------|--------|---------------|
| PI1 | 20.15 | 22.45 | 11-04 | RTL    | Pearl Harbour |
| PI2 | 2.15  | 4.25  | 12-04 | RTL    | Pearl Harbour |

| | Start | Stop | Date | ChName | Title |
|---|---|---|---|---|---|
| | ... | ... | ... | ... | ... |
| PI1 | 20.15 | 22.45 | 11-04 | RTL | Pearl Harbour ☺ ← IND |
| | ... | ... | ... | ... | ... |

Fig.4

| | Start | Stop | Date | ChName | Title |
|---|---|---|---|---|---|
| | ... | ... | ... | ... | ... |
| PI1 | 20.15 | 22.45 | 11-04 | RTL | Pearl Harbour ☺ |
| | 2.15 | 4.25 | 12-04 | RTL | Pearl Harbour ☺ |
| | ... | ... | ... | ... | ... |

Fig.5

METHOD AND APPARATUS FOR AUTOMATICALLY EXTRACTING DATA IDENTIFYING A BROADCAST A/V PROGRAM

This application claims the benefit, under 35 U.S.C. 119, of German patent application no. 05300646.6 filed 3 Aug. 2005.

The present invention relates to a method and an apparatus for automatically extracting data relating to a broadcast audio-video (A/V) program, and in particular data that identify such program.

BACKGROUND

Broadcast program providers usually broadcast schedules of their programs, including at least program titles and start times, but sometimes also additional information like program identifiers that are unique within a certain scope, actor and/or director names, year of production or similar. Also combined schedules including several programs from several providers are known, e.g. an Electronic Program Guide (EPG) service. Further, many A/V devices such as video cassette recorders (VCR), DVD recorders, hard disk drive (HDD) recorders or combinations thereof, offer the possibility to schedule recordings, i.e. to specify at which time a recording shall start.

In today's video and/or DVD recording appliances it is common to extract the programming data for the timer from an integrated Electronic Program Guide (EPG). Devices that provide his feature are e.g. Thomson VPH7090/8090/DTH8000 etc. Generally, the programming data are filtered out of the teletext service or out of special EPG pages according to specified criteria.

It is an experience that very often the same program is broadcasted more than once within a short time range. E.g. an evening program is repeated late at night, or one or few days later. The re-run is often sent on the same channel, but it occurs frequently that a different channel transmits the same program within a short time-frame, or even simultaneously. Moreover, it has been observed that in such cases the programs may have different duration, due to the different duration and amount of commercial interruptions. In general, these cases can be regarded as different instances of the same program, which may differ in matter that is usually not directly connected to the content, such as commercials, banners or other additional data. They must however be distinguished from different episodes of a serial, like e.g. a soap opera, which provide different program content.

SUMMARY OF THE INVENTION

It has been recognized by the inventor that the fact that the same program may be broadcasted more than once within a short time range may give television viewers and users of A/V recorders additional convenience and flexibility for selecting or recording such program.

Today, a user may find out only manually if a particular broadcast program is or will be on air simultaneously or time-shifted on another channel, or if it is repeated later on any channel. The user has to manually search through the EPG, teletext pages of different channels or the newspaper, which may be annoying.

The present invention is based on the recognition of the fact that there may be a choice about which instance of a user-selected program to tune to or record, and that an EPG analysis can be used to detect whether a particular program is repeated or is additionally broadcast on another channel or at another time. This information can be used to generate a convenient display, control a tuner, or schedule a recording.

According to the invention, a method for automatically extracting data identifying a broadcast A/V program from received broadcast data includes the steps of receiving user input data defining a first program, e.g. a program identifier, analyzing an electronic program schedule being received as broadcast data, e.g. EPG, according to the first program, determining at least program name, broadcast start time, end time, duration or broadcast channel of the first program, automatically detecting that a second program is scheduled for broadcast, wherein the second program corresponds to the first program, e.g. has the same program identifier or title as the first program, but has a different broadcast start time, end time, duration or broadcast channel, and displaying on a display at least the program name, broadcast channel, start time, end time or duration of the first program, and an indication indicating that the second program was detected.

In one embodiment, at least the data of the second program that differ from the first program are additionally displayed, e.g. alternative channel or duration.

In one embodiment of the invention, the method includes the further steps of receiving second user input selecting the first or the second program, and selecting the data corresponding to the selected first or second program for further processing.

This embodiment may further include the step of setting a tuner to the channel of the first or second program according to the selected data. Thus, it is possible to construct e.g. an EPG that automatically offers to the user an alternative broadcast time or channel of a program that the user wishes to select for viewing.

The user input data received in the first step may be e.g. the selection of an entry in an EPG, a Showview number or the like. The program identifier may be an alpha-numeric sequence, program name, identification number or similar.

The step of analyzing the electronic program schedule can be repeated until all available program schedule data have been searched through, and further instances of the first program may be found, which are also displayed in the menu.

The step of displaying the second program in the menu may include displaying in the menu at least the data of the second program that differs from the first program, wherein the display is laid-out such that the user may recognize from the appearance in the display that there are different alternative possibilities.

Further, the above-mentioned further processing may include the steps of storing at least the broadcast start time, end time or duration, and channel of the selected program in a timer, and setting or activating a timer for recording.

In one embodiment, the method according to the invention includes the further steps of automatically detecting which of the alternative program instances has a particular advantage according to predefined criteria, and indicating in the display the detected program instance as preferable that has a particular advantage. Alternatively or additionally, it is also possible to automatically detect which of the alternative program instances has a particular disadvantage according to predefined criteria, and mark this program as not preferable. Such particular advantage may be e.g. better reception quality of the channel. Another advantage may be shorter duration of the program. A disadvantage may be e.g. a particular channel that is not preferred for any reason. These criteria can also be combined in order to mark a program instance as preferable or not preferable, wherein the best compromise for the user is selected (e.g. lower though acceptable reception quality but less advertisement breaks). It is 20 also possible to mark more than one program in the display as preferable or not preferable.

In one embodiment, the method according to the invention has the additional step of defining a time at which the electronic program schedule is to be checked for detecting a program change. Preferably, this defining of a time is done while or directly after storing the user input data in a preliminary timer. The defined time may be shortly, e.g. few hours, before the programmed recording should start, so as to detect also short-term program changes. As a reaction on a short-term program change canceling the program that should have been recorded, it is possible to automatically detect an alternative time and/or channel on which the desired program is broadcasted, and to adopt the respective timer value accordingly.

The above-mentioned advantages or disadvantages may be detected from the analysis of the electronic program schedule, but there may also be pre-programmed parameters. E.g. a user or an analysis tool may have defined that a broadcast channel is received at an unacceptably bad quality, though its program is listed in the electronic program schedule. Then this channel may be marked as not preferable or excluded from the selection. A channel is to be understood generally as a reception link, such as a frequency band, a wireless or cable channel, but also internet address etc.

Exemplarily, it may be detected that a program is broadcast on a first channel with subtitles or with two audio tracks in different languages, and on a second channel without. The selection may be based on user-programmed preferences. E.g. if the user always prefers a version with subtitles, then such preferred version is searched and after finding automatically marked as preferable or selected.

If the user input data are used to set a preliminary timer, the timer values for the broadcast start time, end time and/or channel of the user input can be automatically replaced with the corresponding values of the selected preferable program in the effective timer schedule.

In the step of automatically detecting that a second program corresponding to the first program is scheduled for broadcast, it is advantageous to detect not only the main program name, but also additional information that identifies a subtitle, sequential number or similar, e.g. in order to distinguish different episodes of a serial. Therefore, in one embodiment of the invention additional information is detected that identifies different episodes of a serial, so as to distinguish the different episodes. E.g. if the user selects within an EPG the currently broadcasted episode #23 of a series for viewing while episode #24 is also being broadcast on another channel, the additional information is detected, and consequently the episodes are not displayed as equivalent alternatives.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 a structure of an apparatus according to the invention;

FIG. 4 an exemplary EPG menu indicating that an alternative program instance was detected; and FIG. 5 the exemplary EPG menu listing the alternative program instance.

PREFERRED EMBODIMENTS OF THE INVENTION

Figures 1, 2, 3:
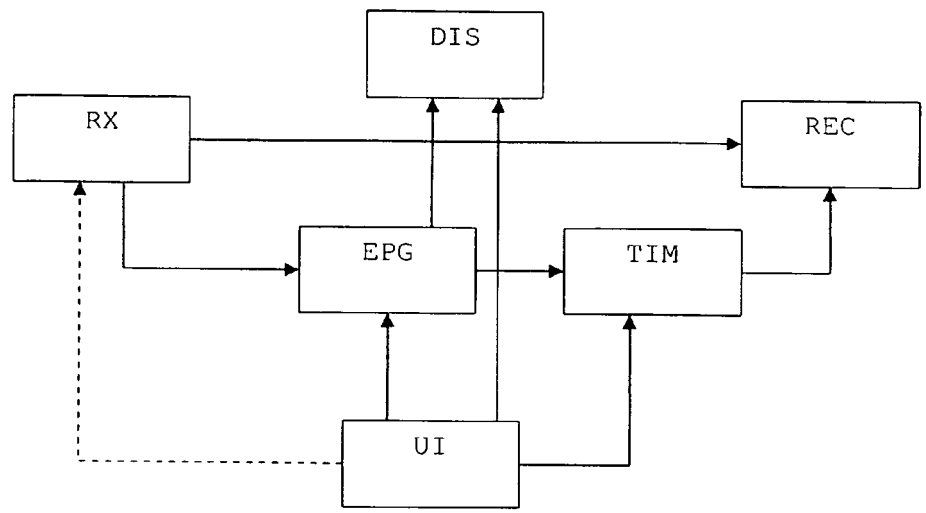
FIG. 2 an exemplary timer menu with two program alternatives where the programs have different duration.
FIG. 3 an exemplary timer menu with two program alternatives where the same program is repeated at a later time.

FIG. 1 shows the structure of an exemplary apparatus for automatically setting a timer, which can be implemented e.g. within a DVD or HDD recording device. From the A/V data received in a receiving unit RX, the program schedule data are extracted and sent to a program guide unit EPG, where they can be used to build a program guide menu display DIS. The program guide menu display contains e.g. the titles of the broadcast programs, and preferably also broadcast time, duration, date and channel. The user may select through a user interface UI a program displayed in the program guide menu display. The selection information is provided to the program guide unit EPG, which uses the selected title to determine available alternatives for the broadcast time, date and/or channel of the program to be recorded, as described below.

In one embodiment of the.invention, the determined information regarding alternative time, date and/or channel are displayed on the program guide menu display, from which the user selects an alternative manually. In one embodiment the selected information comprises the recording time, date and/or channel. This information may be stored in the timer unit TIM, thereby actually setting the timer.

In another embodiment the determined information regarding alternative time, date and/or channel is provided to the timer unit TIM and are stored therein. The timer unit TIM may autonomously or partly autonomously select the actual recording time, date and/or channel according to pre-programmed requirements, such as a preferred channel. The timer unit TIM controls or notifies the recording unit REC at the specified time, date and channel to start the recording.

In one embodiment, the present invention includes automatically detecting if a broadcast program that a user has selected for recording is broadcast a second time at another channel and/or time, and determining if it is favorable for the timer to switch its recording date, time and/or channel to the other program. This may improve utilization of the timer and/or of the available storage space, because the recording may be shorter.

The alternative broadcast times/dates/channels of a user-selected program may be detected always when the user uses an electronic program guide or sets a timer for recording, or only upon user command. For this purpose, a separate button or button function on a remote control may be provided. The separate button function is for determining or displaying if an alternative program for a program displayed on a menu screen or EPG screen is available.

Further, the detected alternative broadcast times/dates/channels may be stored, visibly or invisibly for the user. E.g. a list of programs in an EPG or a list of timers may include an indication for a particular program that has different alternatives available. The alternatives can also be displayed in the list. This is shown in FIG. 4, where an indication IND is displayed for a program that has an alternative instance. After user selection of the program, or automatically, the alternative is displayed, as shown in FIG. 5.

In an embodiment it is automatically detected which of the alternative program instances has a particular advantage according to predefined criteria. There may be various criteria or reasons why a program may be beneficial, which can be considered alone or in any combination.

One criterion may be that there are two alternatives for a user-selected program, wherein for one alternative the program duration is longer than for the other. Then this means usually that more or longer commercial interruptions are included. In this case automatically the shortest alternative is detected and regarded as advantageous. E.g. RTL and ORF1 which can both be received in some regions of Germany or Austria very often broadcast the same program, but RTL inserts commercials and ORF1 does not. In such case, ORF1 may be marked as preferable or automatically selected for recording. This minimizes recording of commercials, and thus saves storage capacity.

The present invention may also be advantageous e.g. in the case of an unexpected program change. The device according to the invention may detect e.g. from EPG or teletext that a scheduled program is subject to a sudden program change, but that it is also broadcasted on another channel. For this purpose e.g. a teletext page or EPG may be supervised in regular intervals, or shortly before due time of a scheduled recording. When the skipping of a scheduled program is detected, an alternative program is searched and displayed. Consequently, the user will easily find out if a program that he wishes to view but which is unexpectedly broadcast e.g. on another channel and/or another time, is shifted or repeated later.

Another advantageous application of the invention may occur in the following scenario: when a user has set a timer in a DVD recorder for recording a particular program, and the recording has already started, the user may want to watch another DVD, while on the other hand he or she is interested in recording the current program. The disc drive however is busy with the recordable disc. In this situation, according to one aspect of the invention, a later broadcast of the same program may be searched, the recording interrupted and the respective timer modified to the later broadcast, although it is already active. The searching of a later broadcast of the same program may be done upon user request, before interrupting the recording, or in advance. The interruption of the recording may be blocked if no alternative is found.

One reason for preferring another program instance than a user-selected instance is that the user-selected channel is not preferred because of lower transmission signal quality. This can be user-defined or automatically detected. E.g. a particular cable channel may have more disturbances than another channel in the same cable due to their different frequencies, since channels in the lower frequency range e.g. VHF show more disturbances than in the higher range, e.g. UHF. The signal quality can be measured automatically, e.g. during a scan operation, and for each channel an indication of its signal quality is stored. A hint to this issue can be displayed for the user viewing a program schedule, or an alternative can be proposed. When operating a timer menu for recording, the timer can be automatically modified if a preferable alternative is available. Further, the user may also define a priority list manually.

Though the range for the time and/or channel parameters is usually determined by the available program schedule information, the range may also be limited to a pre-defined or user-defined range. E.g. only the next four or five days after user input may be allowed for an EPG analysis, or the user selects a program directly from the EPG and the automatic analysis determines the broadcast date and time, and is restricted to the same channel, or e.g. to a range of +/−48 hours, to find an alternative broadcast of the same program. For the recording timer case, the user may also disable the flexibility function completely for a particular timer, while it is enabled for others.

According to one aspect of the invention, the analysis of the program schedule data, e.g. EPG or teletext, includes detecting if the user-selected program and an alternatively broadcasted program is the same episode of a serial. This detection is e.g. based on character comparison of the titles, subtitles or the abstract that may be included in the program guide.

The program identification data will usually include the program title, broadcast start time and broadcast channel. It may however also be the broadcast ending time, program duration, additional indications such as for VPS, and other data. It may also be an identifier with which it is linked to the program in the EPG.

In the following, an exemplary timer for DVD recording is described. The different items of the program information (PI) are retrieved from an EPG and stored as a data base in the main storage. Each PI consists of a label, which includes start time, stop time, date and channel (e.g. number or channel indicator), and the actual program title. The number of characters of the program title is often limited and thus truncated. It is however assumed to be long enough for unique identification of the program.

PI
   Label (Start/Stop/Date/Name) Title (truncated)

If a user has selected a particular program in the EPG for recording, the respective program information PI is stored in a special selection memory PI1.

Then the complete data base is analyzed, and all available titles are compared with the title of the PI stored in the selection memory PI1. Upon coincidence, the new program information PI2 is also displayed within the display menu, as shown in FIG. 2. Now the user has the possibility to select and mark the program to be recorded, using the menu. In the example shown in FIG. 2, the user has the choice between the channels RTL in PI1 and ORF in PI2. As can be seen from the menu, the program entitled "Pearl Harbour" is broadcasted on RTL from 20.15 until 22.45, and on the same date on ORF1 from 20.15 until 22.15. Thus, the timer will prefer the shorter of the two versions, which has in this case no commercial interrupts, unless other criteria prohibit this preference. Such criteria could be e.g. bad reception quality of ORF1, which can be a user-programmed parameter or automatically detected.

As an advantage, the invention provides the possibility to automatically detect and select the same program item broadcasted by different broadcasters at the same or a different time.

According to the invention, an apparatus for automatically extracting data identifying a broadcast A/V program from received broadcast data includes means for receiving user input defining a first program, e.g. user interface, means for analyzing an electronic program schedule according to the first program, means for determining at least program name, broadcast start time, end time, duration or broadcast channel of the first program, means for automatically detecting that a second program is scheduled for broadcast, wherein the second program corresponds to the first program, e.g. has the same program identifier as defined by said user input, but has a different broadcast start time, end time, duration or broadcast channel, and means for displaying at least the program name, broadcast channel, start time, end time or duration of the first program, and an indication indicating that the second program was detected.

Further, an apparatus according to one embodiment of the invention may include means for receiving second user input selecting the first or the second program, and means for selecting the data corresponding to the selected first or second program for further processing.

Moreover, an apparatus according to one embodiment of the invention may include means for setting a tuner to the channel of the first or second program according to the selected data. In another embodiment, the apparatus further includes means for storing at least the broadcast start time, end time or duration, and channel of the selected program in a timer, and means for setting or activating the timer for recording.

The invention can be used e.g. for broadcast television receivers, DVD and/or HDD recorders with access to program data, such as an electronic program schedule or Electronic Program Guide, or teletext pages preferably referring to different channels.

What is claimed is:

1. A method for automatically extracting data identifying a broadcast A/V program from received broadcast data, the method comprising:
    measuring for each of a plurality of channels a transmission signal quality caused by signal disturbances;
    storing for each of the plurality of channels an indication of the measured transmission signal quality;
    receiving user input defining a first program;
    analyzing an electronic program schedule according to the first program;
    determining that the first program is scheduled for future broadcast;
    determining at least program name and broadcast channel of the first program, and the stored transmission signal quality of the broadcast channel of the first program;
    determining broadcast start time and end time, or determining broadcast duration of the first program;
    automatically detecting that a second program is scheduled for future broadcast, wherein the second program corresponds to the first program and has the same content as the first program, but has a different broadcast start time, end time or duration, and a different broadcast channel, wherein the stored transmission signal quality of the broadcast channel of the second program is higher than the stored transmission signal quality of the broadcast channel of the first program;
    displaying at least the program name, broadcast channel, start time, end time or duration of the first program, and an indication indicating that the second program was detected;
    automatically detecting which of the program instances displayed in the menu has an advantage or disadvantage regarding the determined broadcast channel or duration according to predefined criteria, wherein the predefined criteria include higher transmission signal quality and/or shorter duration; and
    indicating in the display the detected program instance that has an advantage as preferable, or indicating in the display the detected program instance that has a disadvantage as not preferable, wherein a criterion for a preferable program is better reception quality of the channel according to said stored transmission quality indication.

2. The method according to claim 1, wherein additionally at least the data of the second program that differ from the first program are displayed.

3. The method according to claim 1, further comprising
    receiving second user input selecting the first or the second program; and
    selecting the data corresponding to the selected first or second program for further processing.

4. The method according to claim 3, further comprising setting a tuner to the channel of the first or second program according to the selected data.

5. The method according to claim 3, further comprising
    storing at least the broadcast start time, end time or duration, and channel of the selected program in a timer; and
    setting or activating the timer for recording.

6. The method according to claim 5, further comprising defining a time at which the electronic program schedule is to be checked for detecting a program change, the time being relative to the scheduled recording start time.

7. The method according to claim 1, wherein the detecting includes detecting additional information that identifies different episodes of a serial.

8. The method according to claim 1, wherein said analyzing an electronic program schedule is limited to a predefined time range being different from the time range provided by the electronic program schedule.

9. The method according to claim 1, wherein better reception quality is automatically detected.

10. The method according to claim 1, wherein better reception quality is detected from a user programmed parameter.

11. An apparatus for automatically extracting data identifying a broadcast A/V program from received broadcast data, the apparatus comprising:
    means for measuring for each of a plurality of channels a transmission signal quality caused by signal disturbances;
    means for storing for each of the plurality of channels an indication of the measured transmission signal quality;
    means for receiving user input defining a first program;
    means for analyzing an electronic program schedule according to the first program;
    means for determining that the first program is scheduled for future broadcast;
    means for determining at least program name and broadcast channel of the first program, and the stored transmission signal quality of the broadcast channel of the first program;
    means for determining broadcast start time and end time, or determining broadcast duration of the first program;
    means for automatically detecting that a second program is scheduled for future broadcast, wherein the second program corresponds to the first program and has the same content as the first program, but has a different broadcast start time, end time or duration, and a different broadcast channel, wherein the stored transmission signal quality of the broadcast channel of the second program is higher than the stored transmission signal quality of the broadcast channel of the first program;
    means for displaying at least the program name, broadcast channel, start time, end time or duration of the first program, and an indication indicating that the second program was detected;
    means for automatically detecting which of the program instances displayed in the menu has an advantage or disadvantage regarding the determined broadcast channel or duration according to predefined criteria, wherein the predefined criteria include higher signal quality and/or shorter duration; and means for indicating in the display the detected program instance that has an advantage as preferable, or indicating in the display the detected program instance that has a disadvantage as not preferable, wherein a criterion for a preferable program is better reception quality of the channel or shorter duration of the program according to said stored transmission quality indication.

12. The apparatus according to claim 11, wherein better reception quality is automatically detected.

13. The apparatus according to claim 11, wherein better reception quality is detected from a user programmed parameter.

* * * * *